United States Patent
Stuart et al.

(10) Patent No.: US 11,500,876 B2
(45) Date of Patent: Nov. 15, 2022

(54) METHOD FOR DUPLICATE DETERMINATION IN A GRAPH

(71) Applicant: International Business Machines Corporation, Armonk, NY (US)

(72) Inventors: Thuany Karoline Stuart, Nice (FR); Basem Elasioty, Regensburg (DE); Claudio Andrea Fanconi, Celerina (SZ); Mike W. Grasselt, Leinfelden-Echterdingen (DE); Hemanth Kumar Babu, Boeblingen (DE); Yannick Saillet, Stuttgart (DE); Robert Kern, Karlsruhe (DE); Martin Oberhofer, Sindelfingen (DE); Lars Bremer, Boeblingen (DE); Jonathan Roesner, Leimersheim (DE); Jason Allen Woods, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/114,547

(22) Filed: Dec. 8, 2020

(65) Prior Publication Data

US 2021/0342352 A1 Nov. 4, 2021

(30) Foreign Application Priority Data

Apr. 29, 2020 (EP) .................................. 20171981

(51) Int. Cl.
*G06F 16/00* (2019.01)
*G06F 16/2455* (2019.01)
(Continued)

(52) U.S. Cl.
CPC .... *G06F 16/24556* (2019.01); *G06F 16/2272* (2019.01); *G06F 16/9024* (2019.01)

(58) Field of Classification Search
CPC ........... G06F 16/24556; G06F 16/2272; G06F 16/9024
(Continued)

(56) References Cited

U.S. PATENT DOCUMENTS

| 7,062,493 B1 | 6/2006 | Babka |
| 10,642,891 B2 | 5/2020 | Choe |

(Continued)

FOREIGN PATENT DOCUMENTS

| CN | 107133257 A | 9/2017 |
| CN | 108985588 A | 12/2018 |

(Continued)

OTHER PUBLICATIONS

Oberhofer et al., "Method for Weighting a Graph", U.S. Appl. No. 17/234,835, filed Apr. 20, 2021, 22 pages.
(Continued)

*Primary Examiner* — Chelcie L Daye
(74) *Attorney, Agent, or Firm* — Brian M. Restauro (57) ABSTRACT

Embodiments of the present invention determines duplicates in a graph. The graph comprises nodes representing entities and edges representing relationships between the entities. The method comprises: identifying at least two nodes in the graph. A neighborhood subgraph may be determined for each of the two nodes. The neighborhood subgraph includes the respective node. The method further comprises determining whether the two nodes are duplicates with respect to each other, based on a result of a comparison between the two subgraphs.

20 Claims, 7 Drawing Sheets

(51) Int. Cl.
*G06F 16/22* (2019.01)
*G06F 16/901* (2019.01)

(58) Field of Classification Search
USPC .................................................. 707/692, 798
See application file for complete search history.

(56) References Cited

U.S. PATENT DOCUMENTS

| | | | |
|---|---|---|---|
| 2009/0262664 | A1 | 10/2009 | Leighton |
| 2010/0063973 | A1 | 3/2010 | Cao |
| 2013/0257874 | A1 | 10/2013 | Saund |
| 2014/0075004 | A1 | 3/2014 | Van Dusen |
| 2014/0149465 | A1* | 5/2014 | Kannan .................. G06F 16/288 707/798 |
| 2014/0280224 | A1 | 9/2014 | Feinberg |
| 2015/0012509 | A1 | 1/2015 | Kirn |
| 2015/0039611 | A1 | 2/2015 | Deshpande |
| 2015/0088841 | A1 | 3/2015 | Fuglsang |
| 2017/0262868 | A1 | 9/2017 | Manjunath |
| 2017/0316175 | A1 | 11/2017 | Hu |
| 2017/0337268 | A1 | 11/2017 | Ait-Mokhtar |
| 2018/0075359 | A1 | 3/2018 | Brennan |
| 2018/0189564 | A1 | 7/2018 | Freitag |
| 2018/0373932 | A1 | 12/2018 | Albrecht |
| 2019/0205479 | A1* | 7/2019 | Zizka ..................... G06F 8/751 |
| 2019/0228224 | A1 | 7/2019 | Guo |
| 2020/0257731 | A1 | 8/2020 | Srinivas |

FOREIGN PATENT DOCUMENTS

| | | |
|---|---|---|
| WO | 2017213537 A1 | 12/2017 |
| WO | 2019220128 A1 | 11/2019 |

OTHER PUBLICATIONS

Appendix P—List of IBM Patents or Patent Applications Treated as Related, Filed herewith, 2 Pages.

"Match comparisons", IBM Documentation, Release date: Dec. 14, 2012, 5 pages, <https://www.ibm.com/support/knowledgecenter/SSZJPZ_9.1.0/com.ibm.swg.im.iis.ds.design.help.doc/topics/c_qresfgde_Match_comparisons.html>.

"Probabilistic vs. deterministic matching styles", IBM Documentation, Last updated: Mar. 24, 2021, 3 pages, <https://www.ibm.com/docs/en/imdm/11.6?topic=data-probabilistic-vs-deterministic-matching-styles>.

Krleza et al., "Graph Matching using Hierarchical Fuzzy Graph Neural Networks", IEEE Transactions on Fuzzy Systems, vol. X, No. Y, Aug. 2016, 13 pages.

Bremer et al. "Duplicate Determination in a Graph", U.S. Appl. No. 17/341,430, filed Jun. 8, 2021, 31 pages.

Bleiholder et al., "Data Fusion", ACM Computing Surveys, vol. 41, No. 1, Article 1, Publication date: Dec. 2008, 41 pages, <http://doi.acm.org/10.1145/1456650.1456651>.

Chawla et al., "SMOTE: Synthetic Minority Over-sampling Technique", Journal of Artificial Intelligence Research 16 (2002) 321-357, Submitted Sep. 2001; published Jun. 2002, 37 pages.

Christen, Peter, "A Survey of Indexing Techniques for Scalable Record Linkage and Deduplication", IEEE Transactions on Knowledge and Data Engineering, 2011, 20 pages.

Stuart et at., "Method for Duplicate Determination in a Graph", Application No. EP20171981.2, Filed Apr. 29, 2020, 29 pages.

Oberhofer et al., "Method for Weighting a Graph", Application No. EP20171979.6, Filed Apr. 29, 2020, 21 pages.

Chen, Alan Chia-Lung, et al. "Approximating the maximum common subgraph isomorphism problem with a weighted graph." Abstract Only, Knowledge-Based Systems 85 (2015): 265-276. (Year: 2015).

Dasan, Sakhti. "Distance Measures—What is Similarity, Dissimilarity and Correlation." Published Aug. 26, 2014. Retrieved Mar. 24, 2022 from https://blog.shakthydoss.com/2014/08/distance-measures-what-is-similarity.html (Year: 2014).

Gross, Geoff. Graph Analytic Techniques In Uncertain Environments: Graph Matching and Link Analysis. Doctoral dissertation, University at Buffalo, State University of New York. Published May 7, 2013. ProQuest Dissertations Publishing. (Year: 2013).

* cited by examiner

METHOD FOR DUPLICATE DETERMINATION IN A GRAPH

BACKGROUND

The present invention relates to the field of digital computer systems, and more specifically, to a method for duplicate determination in a graph.

A database system may, for example, use graph structures for semantic queries with nodes, edges, and properties to represent and store data. The graph relates the data items in the store to a collection of nodes and edges, the edges representing the relationships between the nodes. The relationships allow data in the store to be linked together directly and, in many cases, retrieved with one operation.

SUMMARY

Various embodiments provide a method for graph matching, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for duplicate determination in a graph, the graph comprising nodes representing entities and edges representing relationships between the entities. The method comprises: identifying at least two nodes in the graph, determining a neighborhood subgraph for each of the two nodes, the neighborhood subgraph including the respective node, comparing the two neighborhood subgraphs, and determining whether the two nodes are duplicates with respect to each other, based on a result of the comparison.

In another aspect, the invention relates to a method for identifying a candidate list of duplicate nodes in a graph. The method comprises: calculating an index structure, the index structure comprising, for at least some of the nodes of the graph, an index entry, the index entry including an identifier of the node and an edge descriptor describing an edge connected to that node, the edge descriptor comprising direction information related to a direction of the edge and/or a neighbor node identifier; sorting and grouping the index structure according to the edge descriptors of the individual index entries; selecting a first node and finding further nodes that are in the same group as the first node, resulting in the candidate list.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for duplicate determination in a graph, the graph comprising nodes representing entities and edges representing relationships between the entities. The computer system is configured for: identifying at least two nodes in the graph, determining a neighborhood subgraph for each of the two nodes, the neighborhood subgraph including the respective node, comparing the two neighborhood subgraphs, and determining whether the two nodes are duplicates with respect to each other, based on a result of the comparison.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A graph refers to a property graph where data values are stored as properties on nodes and edges. Property graphs may be managed and processed by a graph database management system or other database systems which provide a wrapper layer converting the property graph to, for example, relational tables for storage and convert relational tables back to property graphs when read or queried. The graph may, for example, be a directed graph. The graph may be a collection of nodes (also called as vertices) and edges. The edge of the graph connects any two nodes of the graph. The edge may be represented by an ordered pair (v1, v2) of nodes and that can be traversed from node v1 (starting node) toward node v2. A node of the graph may represent an entity. The entity refers to a user, object etc. The entity may have certain entity attributes or properties which may be assigned values. For example, a person may be an entity. The entity attributes of the person may, for example, comprise a marital status, age, gender etc. The edge may be assigned edge attribute values indicative of at least a relationship between the two nodes connected to the edge. The relationship may, for example, comprise an inheritance (e.g. parent and child) relationship and/or associative relationship in accordance with a certain hierarchy. For example, the inheritance relationship between nodes v1 and v2 may be referred to as a "is-a relationship" between v1 and v2 e.g. "v2 is-a parent of v1". The associative relationship between nodes v1 and v2 may be referred to as a "has-a relationship" between v1 and v2 e.g. "v2 has a has-a relationship with v1" means that v1 is part or is a composition of or associated with v2.

The graph may represent entities and relationships of a set of one or more domains. A domain (also referred to as domain ontology) represents concepts or categories which belong to a part of the world, such as biology or politics. The domain typically models domain-specific definitions of terms. For example, a domain can refer to a healthcare, advertising, commerce, medical and/or biomedical-specific field. The set of one or more domains may represent an ontology. For example, the set of domains may comprise a family domain and company domain, wherein the family domain and company domain belong to a same ontology which may be an employee ontology.

Processing the graphs may however technically be challenging because the graphs have usually millions of nodes and edges such as a graph that stores data of millions of customer records, contracts, etc. as well as person records related to companies with hundreds of thousands of employees. This may be particularly challenging in case of data deduplication. For example, a master data management (MDM) system uses graphs as persistency storage to identify duplicate records and needs to resolve them if applicable. This process is a matching process and uses deterministic and/or probabilistic matching techniques with fuzzy operators such as phonetics (Soundex, NYSIIS, . . . ), edit distance, nick name resolution, etc. The present subject matter may improve the performance of this kind of processes. For that, the matching in accordance with the present subject matter may consider two master data entities as duplicates if their relationship network to neighboring entities shows a high degree of similarity. In graph terms, if two records represented as nodes in the graph have a high degree of local subgraph similarity, they may be considered as duplicates. As a result, very important insights of whether or not two records should be merged is factored into the decision making process producing optimal results.

According to one embodiment, the determining of the neighborhood subgraph of the node comprises: selecting nodes of the graph using a selection criterion. The selection criterion is based on at least one of: a number of nodes, an entity represented by a node, wherein the subgraph comprises the selected nodes. This may enable an automatic and thus efficient duplicate determination in accordance with the present subject matter.

According to one embodiment, the selection criterion requires at least one of: the number of nodes of the subgraph being smaller than a maximum number; and the edge of the subgraph connected to at least one node that represents a same entity as the entity of the node. For example, the computer system may be provided with configurable parameters associated with these criteria. The configurable parameters may dynamically be adapted depending on the use cases.

According to one embodiment, the comparison of the two subgraphs comprises calculating a similarity metric, comparing the calculated similarity metric with a predefined threshold, and in response to determining that the similarity metric exceeds the predefined threshold determining that the two nodes are duplicates, otherwise determining that the two nodes are not duplicates. For example, two thresholds may be provided, a lower and upper threshold. If the similarity metric is below the lower threshold, this indicates that the two nodes are not duplicates. If the similarity metric is between the lower threshold and the upper threshold, a clerical task may be created so that a user can decide whether the two nodes are duplicates. If the similarity metric is higher than the upper threshold, the two nodes may be duplicate nodes. This may result in a decision that the two nodes are duplicates.

According to one embodiment, the method further comprises in response to determining that the two nodes are duplicates performing a twin detection method. The twin detection method may be configured to determine whether the at least two nodes represent twins, triplet, quadruplet, etc. The twin detection method comprises acquiring additional properties of the entities represented by the two nodes, and cancelling a decision that the two nodes are duplicates with respect to each other based on the additional properties. The additional properties may comprise relationship data describing relationships of the two nodes. The relationship data may, for example, be compared with reference relationship data of twins (e.g. reference relationship data comprises relationship types indicating that two nodes have the same parents). Based on the comparison result, the decision may be cancelled or maintained. This embodiment may enable to detect newly born twins' records in the graphs. This may avoid false positives as match results for twins (and related triplets, quadruplets, etc.). This may particularly be advantageous as the graph matching may not be perfect. That is, given real two duplicate nodes in a graph, the matching between the two subgraphs representing the two nodes may not be exactly the same (although the two nodes are duplicates). For this reason, the comparison of the similarity metric or score with thresholds may provide an estimate of the presence or not of the duplicates. However, in case of twin records, this similarity score may be as high as for real duplicates. For that reason, this embodiment may use additional criteria in order to keep or cancel the decision.

According to one embodiment, the identifying of the at least two nodes comprises: calculating an index structure. The index structure comprises, for each node of the graph, at least one index entry. The index entry includes an identifier of the node and an edge descriptor describing an edge connected to that node. The edge descriptor comprises direction information related to a direction of the edge and/or a neighbor node identifier. The index structure may be sorted and grouped according to the edge descriptors of the individual index entries, resulting in a set of one or more groups. A first node of the at least two nodes may be selected and further nodes that are in the same group, of the set of groups, as the first node may be identified. In another example, a list of nodes of each group may be created, resulting in lists. Duplicate lists of the resulting lists may be removed. In addition, lists which are sub-lists of other lists may be removed. The nodes of each list of the remaining lists may be compared with each other to determine duplicate. That is, each remaining list of the remaining lists may be a candidate list of duplicates.

For example, a computer system such as an MDM system may be configured to identify duplicate records where applicable and to resolve them if applicable. Other embodiments of duplicate detection algorithms are extract-transform-load (ETL) software applications. When a new record is added to the system, the system may identify its possible duplicates in order to automatically merge them or create a task that should be latter resolved by a data steward. To avoid the comparison of the new record with all the existing records in the graph, this embodiment may use a bucketing method to find a candidate list which is a small subset of candidates where there is a real possibility to find a match of the new record. This may prevent a costly and slow performing comparison against all records where on the vast majority there may be no chance to find a match. The bucketing method may be enhanced by adding buckets capturing the neighborhood information of nodes in a graph.

This embodiment may be advantageous, because the candidate search may be computational efficient. Indeed, the candidate search may minimize the number of false negatives where the false negative is the result of two subgraphs being slightly different (e.g. one subgraph having an edge and vertex which does not exist in the other). This embodiment may be advantageous compared to a hash code method because it may not be trivial to encode the node neighborhood in a hash-code.

According to one embodiment, the individual index entries are represented as text strings. This may speed up the search within the index structure and may thus further improve the efficiency of the present method.

For example, the index structure may be built as follows. A two columns table may be created to contain the index. For each node vi in the graph, all edges {E} connected to that node vi may be identified. For each edge Ej of the identified edges {E}, a row may be created in the table with the node vi and a string representation of the direction, edge type and the node at the other side of the edge (e.g. <edge_direction><edge_label><other_node_id>). For each group of K edges of {E}, where K>=2 and K is smaller than a predefined threshold, a row with the node vi and a concatenation of the string representations of descriptors of the edges of the group may be created. When concatenating the strings, the parts of the string may be sorted so that the order is reproducible. Once the table is complete (e.g. all nodes were analyzed), the table may be sorted and grouped by the second column. All rows belonging to a group of either size 1 or size>maxSize (maxSize is a predefined threshold) may be removed from the table. The resulting table or groups may be used depending on the processing scenario. If the scenario is to find all pairs of match candidates in the graph, the table may be processed as follows. For each group of rows in the index with the same value in the second column, the associated nodes in the first column may be identified as a candidate group of nodes, to be compared with each other. Candidate groups of the candidate groups which are duplicated or are fully contained in other candidate groups may be removed, resulting in remaining groups. For each remaining group of the remaining groups, a detailed comparison of each node against each other node in the same group may be performed. If the scenario is to find all match candidates in the graph for a particular new node vnew, the table may be used as follows. New rows corresponding to the new node may be added to the index as described previously. The table may be resorted and regrouped. The groups {G} containing the new node vnew may be searched. And a list of all distinct nodes {Vmatch} which are found in any group of G may be computed. A comparison of each node in {Vmatch} may be performed against the new node vnew to find possible matching candidates.

According to one embodiment, the grouping further comprises deleting groups based on their size. This may prevent unnecessary searches in groups which are most likely useless. Thus, this may further improve the efficiency of the present method.

According to one embodiment, the determining of the neighborhood subgraphs comprises removing duplicate nodes of each subgraph of the neighborhood subgraphs.

According to one embodiment, the method further comprises using a received indication of the two identified nodes for the identifying. For example, a user may provide an input or a request. The received request or input comprises information about the at least two nodes. This information may be used to identify the at least two nodes in the graph.

Figure 1A:
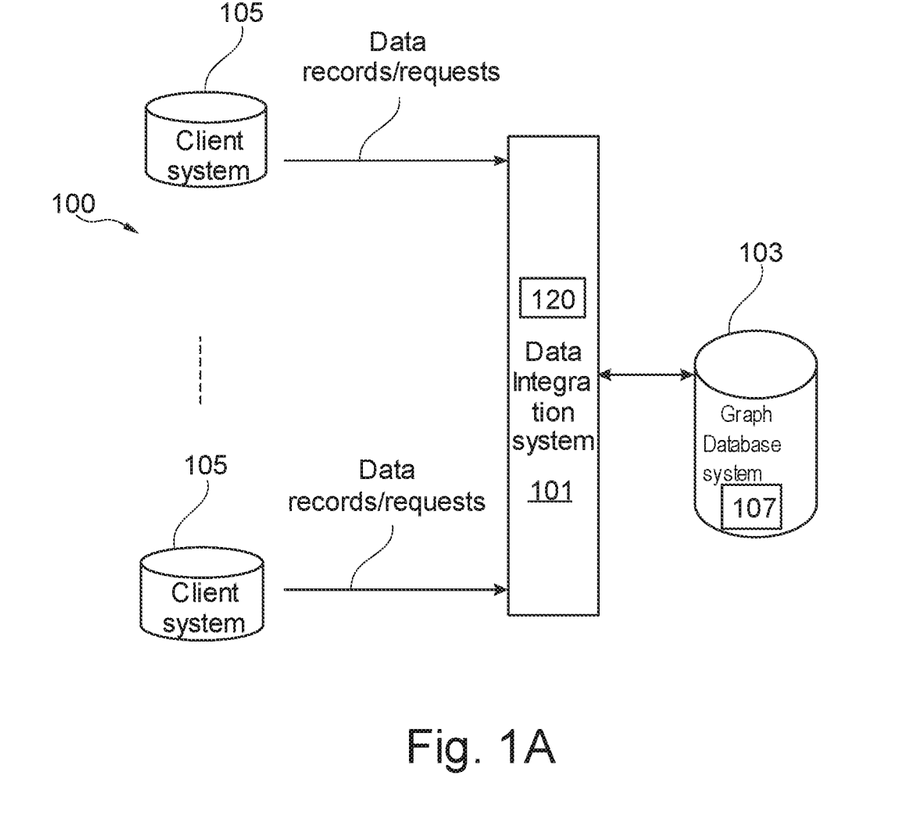
FIG. 1A is a diagram of a computer system in accordance with an example of the present subject matter.

FIG. 1A depicts an exemplary computer system 100. The computer system 100 may, for example, be configured to perform master data management and/or data warehousing e.g. the computer system 100 may enable a de-duplication system. The computer system 100 comprises a data integration system 101 and one or more client systems or data sources 105. The client system 105 may comprise a computer system (e.g. as described with reference to FIG. 6). The data integration system 101 may control access (read and write accesses etc.) to a graph database system 103.

The client systems 105 may communicate with the data integration system 101 via a network connection which comprises, for example, a wireless local area network (WLAN) connection, WAN (Wide Area Network) connection LAN (Local Area Network) connection or a combination thereof.

The client system 105 may be configured to receive or generate a query request. For example, the client system 105 generates or receives a query request at the graph database system 103. The query request may, for example, request the identification of duplicate nodes. The client system 105 sends or forwards the query request to the data integration system 101. The data integration system 101 may be configured to fetch data using the graph database system 103 to compute the appropriate subsets of a graph 107 of the graph database system 103 to be sent back to the client system 105 in response to the query request.

In another example, each client system 105 may be configured to send data records to the data integration system 101 in order to be stored by the graph database system 103. A data record or record may be a collection of related data items such as a name, date of birth and class of a particular entity. A record represents an entity, wherein an entity refers to a user, object, or concept about which information is stored in the record. The terms "data record" and "record" are interchangeably used. The graph database system 103 may use a graph 107 in order to store the records as entities with relationships, where each record may be assigned to a node or vertex of the graph 107 with properties being attribute values such as name, date of birth etc. The data integration system 101 may store the records received from client systems 105 using the graph database system 103 and checks for duplicate nodes in the graph 107. For example, the client systems 105 may be configured to provide or create data records which may or may not have the same structure as the graph 107. For example, a client system 105 may be configured to provide records in XML or JSON format or other formats that enable to associate attributes and corresponding attribute values.

In one example, the data integration system 101 may import data records from a client system 105 using one or more Extract-Transform-Load (ETL) batch processes or via HyperText Transport Protocol ("HTTP") communication or via other types of data exchange. The data integration system 101 and/or client systems 105 may be associated with, for example, Personal Computers (PC), servers, and/or mobile devices.

The data integration system 101 may be configured to process the received records using one or more algorithms such as an algorithm 120 implementing at least part of the present method. For example, the data integration system 101 may process data records of the graph 107 using the algorithm 120 in order to find pairs of records that represent the same entity or duplicate records in accordance with the present disclosure. Although shown as separate components, the graph database system 103 may be part of the data integration system 101 in another example.

Figure 1B:
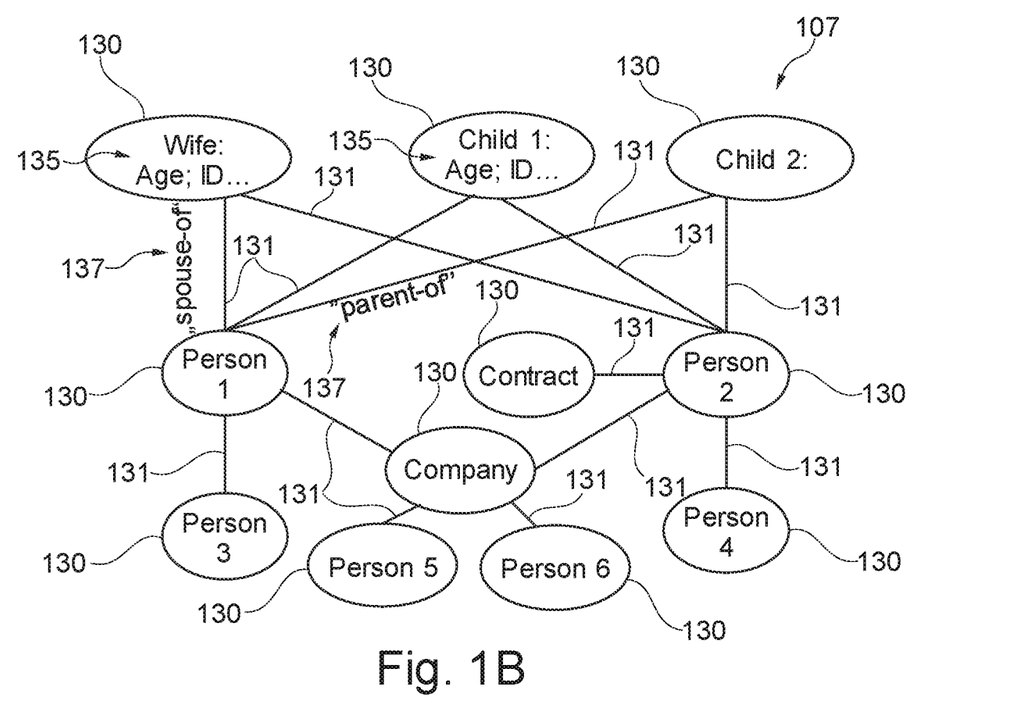
FIG. 1B is a diagram of a simplified structure of a graph in accordance with an example of the present subject matter.

FIG. 1B is a diagram of a simplified structure of the graph 107 in accordance with an example domain ontology. The example ontology concerns employees of a company. The graph 107 has a plurality of nodes 130 which represent employees of the company. Each of the nodes 130 may comprise attribute values of entity attributes of a respective record. For example, a node 130 representing a wife has attribute values of entity attributes 135 such as age, ID etc. The nodes 130 are linked together by a plurality of edges 131. The edge 131 is associated with edge attribute values 137 indicative of the relations between respective nodes. For example, the edge 131 linking the node person1 and the node wife is associated with an edge attribute value "spouse-of" indicating that that the person represented by the node person1 is a spouse of the person represented by the node wife. By traversing the graph 107, the data integration system 101 can find out which respective nodes are related to other nodes.

The graphs are represented in the present drawings as follows. The nodes of a graph are represented by circles/ellipses in the drawings and the edges are represented by lines connecting two nodes of the graph. Entities such as wife, Person1 etc. which are represented by the nodes are written inside the circles. For simplification of the drawings and the description, only part of the nodes and edges are shown with part of their associated entity and edge attributes. However, each node and each edge of a graph may be associated with one or more entity attributes and one more edge attributes respectively.

Figure 2:
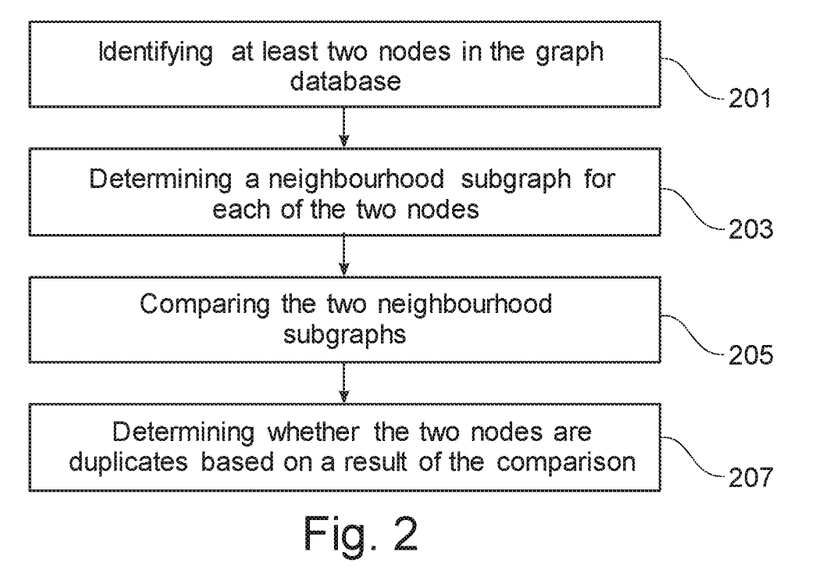
FIG. 2 is a flowchart of a method for duplicate determination in a graph in accordance with an example of the present subject matter.

FIG. 2 is a flowchart of a method for duplicate determination in a graph e.g. 107, in accordance with an example of the present subject matter. For the purpose of explanation, the method may be implemented in the computer system 100 illustrated in previous FIGS. 1A-B, but is not limited to this implementation. The method may for example be performed by the data integration system 101.

Figure 5A:
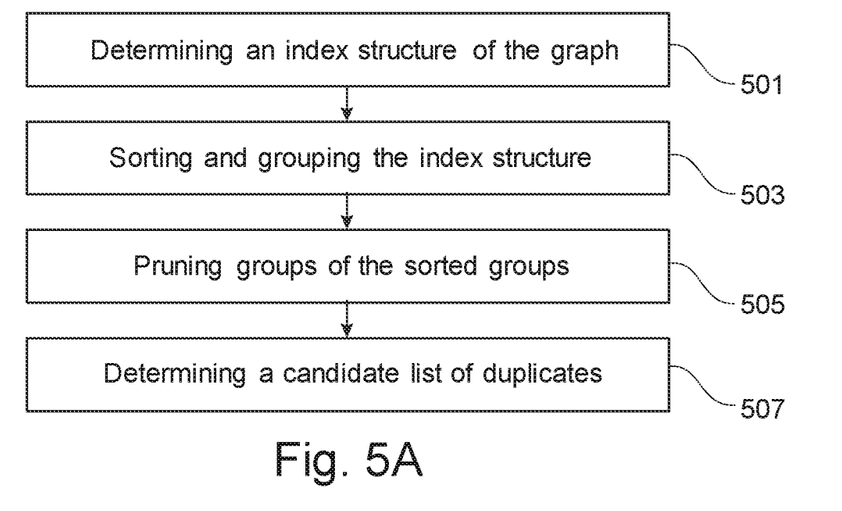
FIG. 5A is a flowchart of a method for identifying a candidate list of duplicate nodes in a graph in accordance with an example of the present subject matter.

At least two nodes may be identified or determined in the graph 107 in step 201. The identified nodes may be candidate duplicate nodes. In one example, two nodes may be identified in step 201. In another example, more than two nodes may be identified in step 201. Identifying the nodes in step 201 may, for example, be performed automatically e.g. the two nodes may randomly be selected from the graph 107. This may be advantageous in case of a need to deduplicate the whole graph. In another example, the identifying of the nodes may be performed using an information or request received from a user. The received information or request may indicate nodes. Those indicated nodes may be identified in step 201. In another example, the identifying of the nodes in step 201 may be performed in response to inserting or adding a new node in the graph 107, wherein the inserted node is part of the identified nodes. This may enable a controlled data storage in the graph 107. FIG. 5A provides an example for identifying the at least two nodes.

For simplification of the description, the number of the identified nodes in step 201 may be two nodes e.g. node1 and node2 but it is not limited to.

For each of the two nodes, a neighborhood subgraph of the graph 107 may be determined in step 203. This may result in a neighborhood subgraph that comprises node1 and another neighborhood subgraph that comprises node2. The neighborhood subgraph of node1 in the graph 107 may be the subgraph of the graph 107 induced by neighboring nodes to node1 e.g., the subgraph composed of the nodes adjacent to node1 and all edges connecting nodes adjacent to node1. An adjacent node of node node1 in the graph 107 is a node that is connected to node1 by an edge.

In one example, a user may be prompted to determine the subgraphs by presenting on a display, the graph 107 and the two identified nodes e.g. a zoom of the graph 107 around the two identified nodes may be displayed. The user may provide an input indicative of the two subgraphs.

In one example, the subgraphs may automatically be determined using one or more selection criteria or conditions. For example, the subgraph of node1 should fulfill a first condition according to which each edge of the subgraph is connected to at least one node that represents a same entity as the entity of the node node1. The at least one node may, for example, be the starting node of the edge. That is, the first condition may require that each edge of the graph has a starting node that represents a same entity as the entity of the node node1. This may enable to obtain a subgraph that represents a same domain and thus may enable an efficient subgraph mapping. However, the size of the resulting subgraph may be large e.g. the number of nodes in the subgraph is higher than a threshold. In this case, the first condition may be supplemented with a second condition according to which the maximum distance between node1 and any node in the subgraph may be N edges where e.g. N>=2. The distance between two nodes in a graph may be the number of edges in a shortest path connecting them. For example, in case the adjacent node adj1 of the node node1 represents the same entity as node1 and N=2, then an adjacent node adj3 of the adjacent node adj1 and their connecting edge (i.e. between adj1 and adj3) may be added to the subgraph. In other words, a path from the node node1 via node adj1 may include at most node1 and adj1 and adj3 in case adj1 represents the same entity as node1. Or a path from the node node1 may include at most node1 and adj1 in case node adj1 represents an entity different from the entity represented by node1. For example, if node1 represents a person and the adjacent node adj1 represents a company, then a path from node1 includes adj1 at most. In another example, if node1 represents a person and the adjacent node adj1 represents also a person, then a path from node1 can include adj1 and one other node adjacent to adj1 if N=2. The determination of the subgraph of node2 is similar to the described determination of the subgraph of node 1.

Hence, the selection criteria enable a controlled and efficient selection of the subgraphs and thus an optimal mapping of the subgraphs. The determined subgraphs may further be improved by using one or more predefined filtering rules. For example, a first filtering rule may require that edges of predefined types may be filtered out of the determined subgraphs. A second filtering rule may require that a node representing a predefined entity may be filtered out or assigned a low weight that should be considered during the subgraph mapping. The filtering rules may optionally be applied on the determined subgraphs.

The determined subgraphs may be compared or mapped to each other in step 205. For example, a similarity score may be determined based on the comparison result between the two subgraphs. The similarity score may be a probability score indicating how likely it is that the two nodes node1 and node2 are the same. This may be advantageous as an exact match between two subgraphs may not be achieved (even if the two nodes are duplicates) if one of the two nodes node1 and node2 has an additional information e.g. an additional edge which is not part of the other subgraph. For example, node1 may be inserted in the graph by a first user and node2 may be inserted by a second user. Although the two nodes are representing the same entity, one of the two users may include additional information which the other user did not consider.

It may be determined, in step 207, whether the two nodes node1 and node2 are duplicates with respect to each other based on a result of the comparison performed in step 205. In one example, if the two subgraphs are the same, the two nodes node1 and node2 may be duplicate nodes. In another example, the similarity score may be used to decide whether the two nodes node1 and node2 are duplicates. If the similarity score is below a first lower threshold, this indicates that the two nodes are not duplicates. If the similarity score is between the first lower threshold and a second upper threshold, clerical task may be created so that a user can decide whether the two nodes are duplicates. If the similarity score is higher than the second upper threshold, the two nodes node1 and node2 may be duplicate nodes.

In case it is determined that the two nodes node1 and node2 are duplicate nodes, the two nodes node1 and node2 may be merged and a correct edge embedding may be reestablished in the graph 107.

Figure 3A:
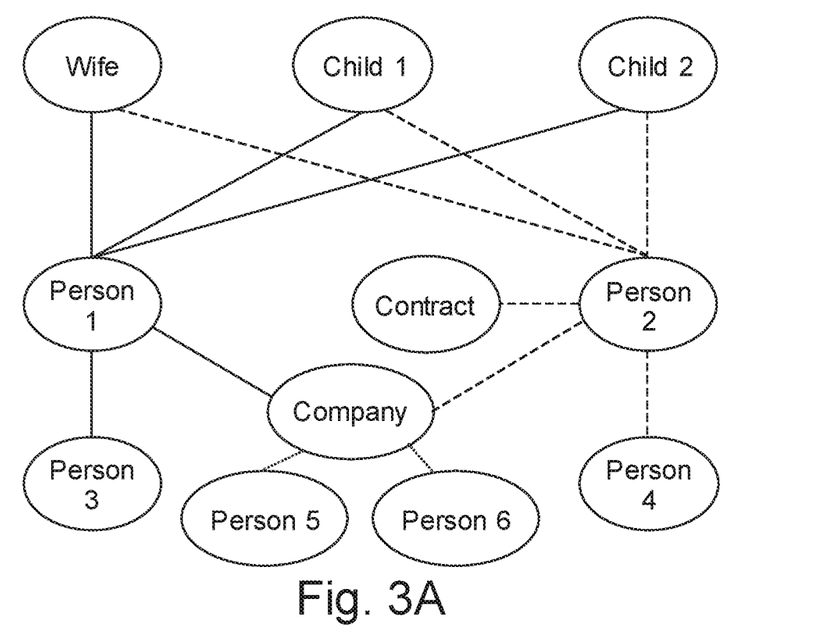
FIG. 3A shows two subgraphs determined in accordance with an example of the present subject matter.

FIG. 3A is a diagram of the graph 107 shown in FIG. 1B. FIG. 3A shows two subgraphs determined in accordance with the present subject matter for the two nodes representing person1 and person2 respectively. The determined subgraph of node person1 has edges with solid lines and has nodes representing wife, child1, child2, company and person3, while the determined subgraph 302 of node person2 has edges with dashed lines and has nodes wife, child1, child2, contact, company and person4.

The two subgraphs may be determined using the following selection conditions: Degree out person to person=2 and Degree out person to company=1. The "degree out person to person" refers to a maximum distance of a path starting from a node representing a person and including an adjacent node representing a person. The "degree out person to company" refers to a maximum distance of a path staring from a node representing a person and including an adjacent node representing a company. This results, for example, in nodes person5 and person6 being not considered because the person to company's degree out is 1 i.e. the distance between the node of person2 and the node of person6 is two which is higher than the maximum distance (which is one) because the two first nodes of the path starting from node person2 represent different entities. The two subgraphs may further be determined using the filtering rule according to which only person and company nodes are included in the subgraphs.

By comparing or mapping the two subgraphs, it may be determined whether the two nodes person1 and person2 represent the same person i.e. duplicates. As described with reference to FIG. 2, a similarity score may be computed based on the comparison of the two subgraphs. As described above, the similarity score may be advantageous as an exact match between two subgraphs may not be achieved. The mapping of the two subgraphs may not be perfect for the following reasons. The node person3 exists in the subgraph of node person1 only and node person4 exists in the subgraph of node person2 only. Nodes person1 are person2 may not be considered (e.g. if a condition on the distances between nodes, to be considered when performing the comparison, is fulfilled).

The mapping of the two subgraphs may result in the following pairs of nodes ((wife, wife), (child 1, child 1), (child 2, child 2), (company, company), (person 1, person 2), (person 3, person 4)), wherein 4 out of 6 pairs are identified to be the same nodes. Thus, a similarity score (e.g. 4/6) may be computed based on the comparison result.

Figure 3B:
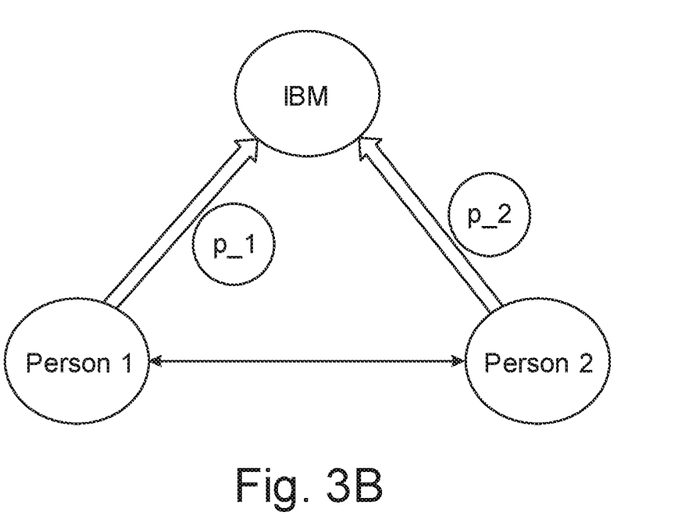
FIG. 3B shows a subgraph determined in accordance with an example of the present subject matter.

FIG. 3B shows a subgraph, e.g. of the graph 107, of three nodes where nodes person1 and person2 both have a relationship with the node COMPANY A indicating for example an employed by relationship. Assuming, for example, that the graph 107 has U=20 million person records and that COMPANY A has 400 thousand employees. So, in case the matching indicates a similarity between nodes person1 and person2—the probability of these two people should factor in the fact that both share the same relation to COMPANY A, e.g. $p\_1*400\,k+(1-p\_1)*U$. This may enable to introduce a measure considering a relationship to a common node where information on that node reduces the search space drastically (at least one factor of magnitude). For example, the fact that the two nodes are linked to a same node representing COMPANY A and that COMPANY A has 400 thousand employees, this may prevent searching the whole 20 million nodes by reducing the search space to nodes that are related to the node COMPANY A.

Figure 4A:
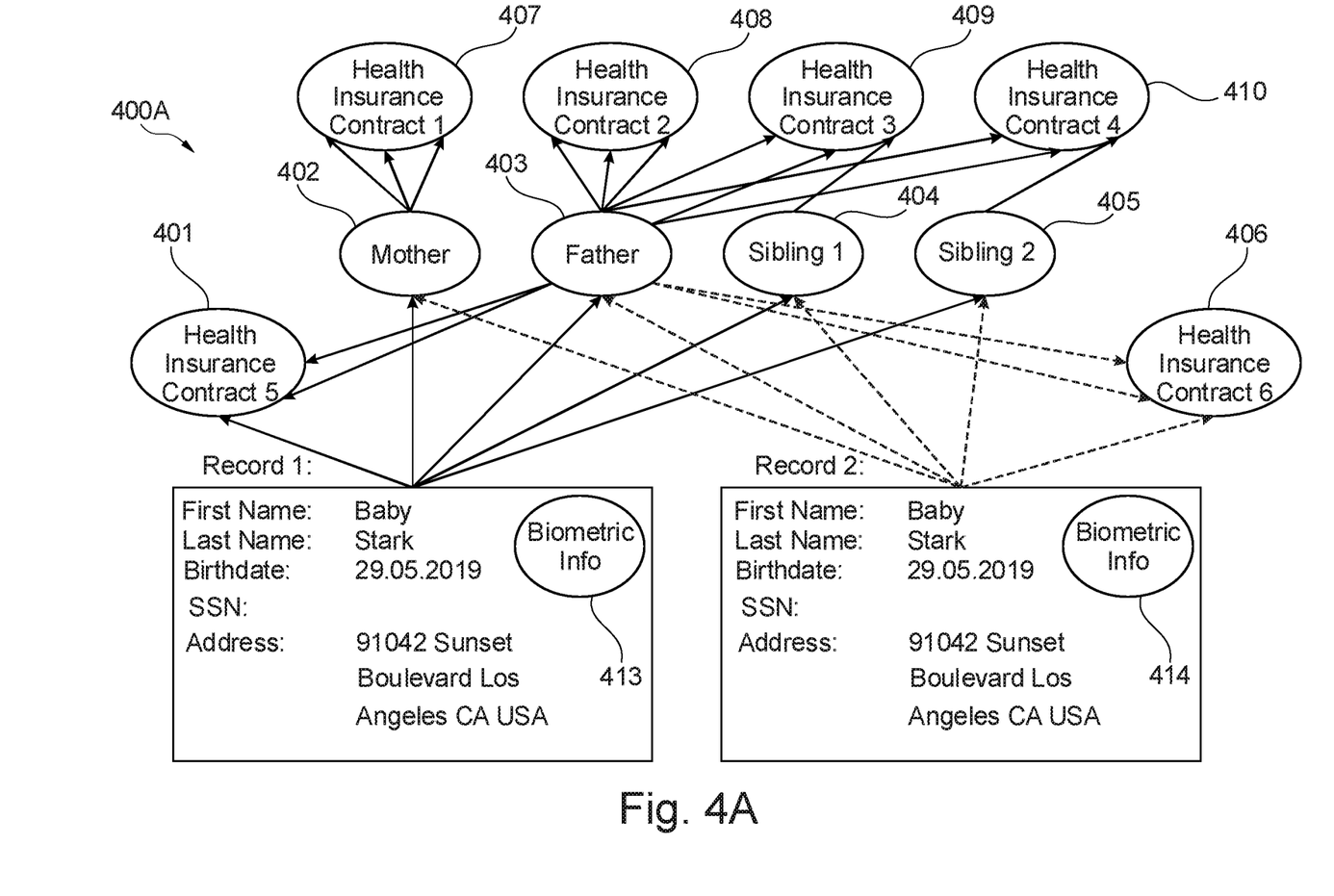
FIG. 4A shows two subgraphs determined in accordance with an example of the present subject matter.

FIG. 4A shows two subgraphs of a graph 400A, determined in accordance with the present subject matter for the two nodes record1 and record2. The first subgraph of the node record1 includes all solid lines edges, node record1, nodes 401 to 405 and nodes 407 to 410. The second subgraph of the node record2 includes all dashed lines edges and edges linking nodes 402 to 405 and nodes 407 to 410. The second subgraph includes node record2, nodes 402 to 406 and nodes 407 to 410. The relationships between each of the nodes 402 to 405 and each node of the nodes 407 to 410 may indicate: insured in this contract, payee on contract and contract owner.

The first and second subgraphs may be compared or matched. In one example, the comparison may be performed in case a feature comparison between attributes values of the nodes of the two subgraphs indicate a predefined similarity level. The comparison between the first and second subgraphs and the resulting similarity score as described with reference to FIG. 2, indicates that the two nodes record1 and record2 are duplicates. However, as the two nodes record1 and record2 may be twins as indicated in FIG. 4A, the present method uses additional constrains in order to maintain a decision that the two nodes are duplicates or to cancel that decision. For that, a graph twin detection measure may be computed. This may use as input a twin configuration based on selected relationship types for twins (e.g. family relationships, relevant roles on health insurance contracts, etc.) in order to compute a graph matching comparison on these subsets. For example, a set of predefined edge attributes and/or entity attributes indicative of twin relationships and twin neighborhood nodes may be provided. Attributes of the edges and neighboring nodes of the two nodes record1 and record2 may be compared with the predefined attributes. The twin detection measure may be evaluated based on the comparison result. In one example, the twin detection measure may be computed based on a further comparison result of a comparison of a biometric feature 413 and 414 of the two nodes record1 and record2. The biometric feature 413 and 414 may, for example, be a toe print and/or fingerprint of the person represented by the respective node. This may avoid false positives on siblings resulted from a multiple birth.

If the difference between the graph twin detection measure and the similarity score is below a configured threshold, the two nodes record1 and record2 may be marked as records to be kept separate (retain) because they are twins. Thus, the decision may be canceled as the two nodes represent twins. This is by contrast to the example of FIG. 4B, where the difference between the graph twin detection measure and the similarity score of the two subgraphs of nodes record1 and record2 of the graph 400B, is higher than the configured threshold. In another example, only the twin detection measure may be used to maintain or cancel the decision.

Figure 4B:
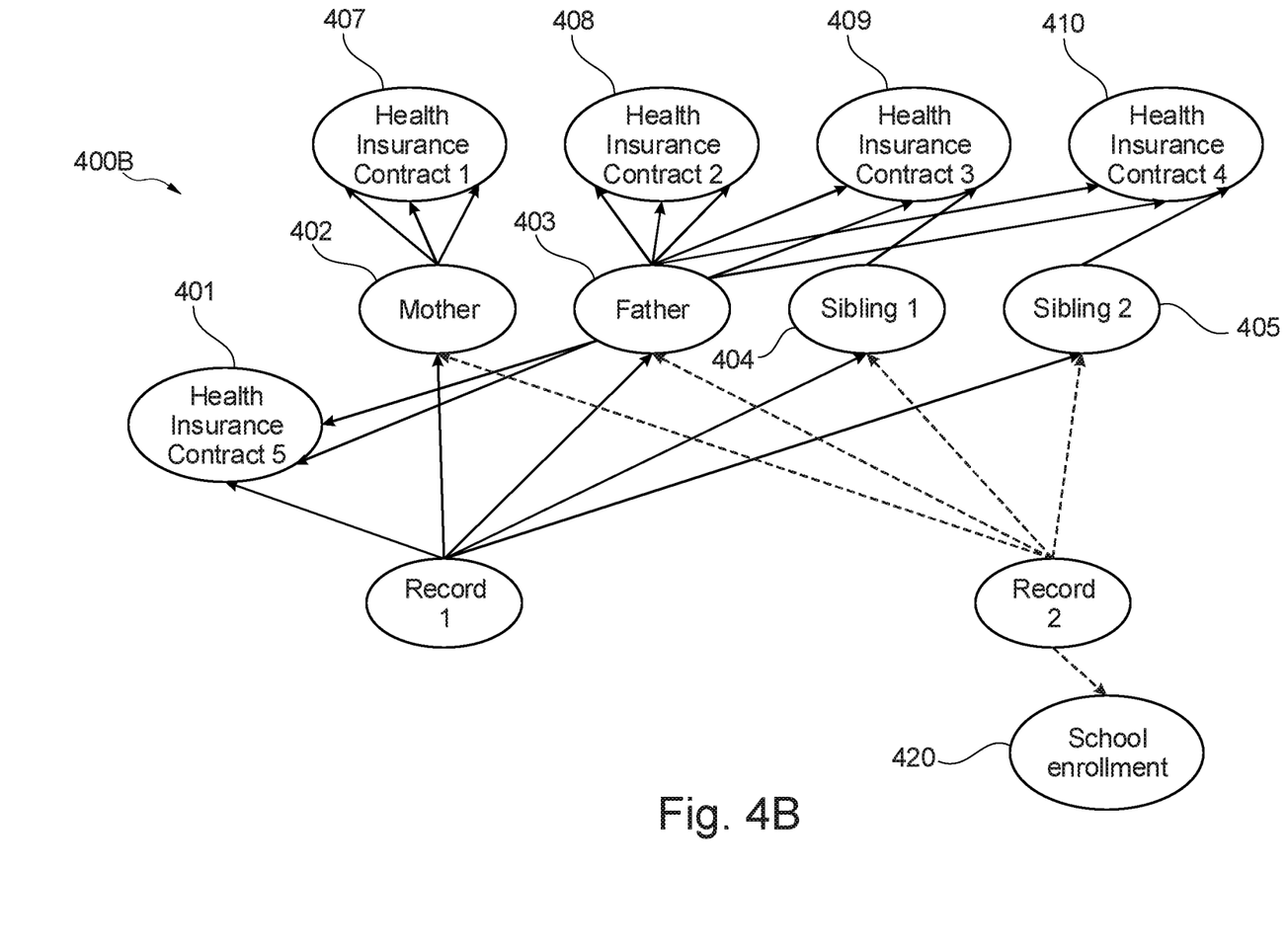
FIG. 4B shows two subgraphs determined in accordance with an example of the present subject matter.

In FIG. 4B, the first subgraph of the node record1 includes all solid lines edges, node record1, nodes 401 to 405 and nodes 407 to 410. The second subgraph of the node record2 includes all dashed lines edges and edges linking nodes 402 to 405 and nodes 407 to 410. The second subgraph includes node record2, nodes 402 to 405, nodes 407 to 410 and node 420. As with FIG. 4A, the relationships between the nodes 402 to 405 and nodes 407 to 410 may indicate: insured in this contract, payee on contract and contract owner. The difference between the graph twin detection measure and the similarity score of the two subgraphs of nodes record1 and record2 of the graph 400B, is higher than the configured threshold. In this case, the decision may be maintained as the two nodes record1 and record2 are indeed duplicates.

FIG. 5A is a flowchart of a method for identifying a candidate list of duplicate nodes in a graph in accordance with an example of the present subject matter. For the purpose of explanation, the method of FIG. 5A may be described with reference to the graph 520 of FIG. 5B but is not limited to.

Figure 5B:
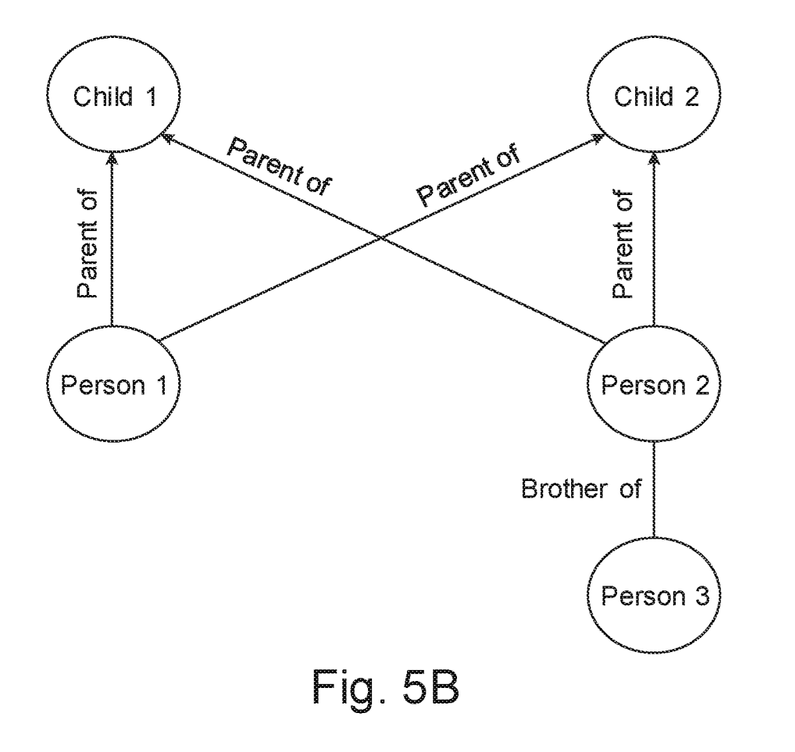
FIG. 5B depicts a graph in accordance with an example of the present subject matter.

An index structure of the graph 520 may be determined in step 501. The index structure comprises at least one index entry per node of the graph 520. For example, if a node has more than one relationship, there will be one entry for each n-gram of the relationships. The index entry includes an identifier of the node and an edge descriptor describing an edge connected to that node. The edge descriptor comprises direction information related to a direction of the edge and/or a neighbor node identifier. For example, a node vi has a list of relationships Rvi={(vi, vj, direction, type)}, where each relationship of the list links the node vi with another node vj, and has a type and a direction. The direction may, for example, be an incoming, outcoming or bidirectional. Each unique set of relations (e.g. each N-gram of Rvi) may be represented by one entry in the index structure with the node vi being the entity. That is, every unique groups of N relations of Rvi may be represented by a respective index entry. For example, every single relation of Rvi may be represented by a respective index entry, every unique groups of two relations of Rvi may be represented by a respective index entry etc. Each created entry in the index contains a string representation of the node vi as a key and a string representation of the relationships, or groups of relationships as a value. The string representation of the relationship may encode the ID of the second node vj, the direction and the type of the relationship. If the entry contains more than one relationship, they may be sorted alphabetically and concatenated into a single string. The resulting index structure may be as follows, where the first column refers to the node and the second column refers to the edge descriptor (see e.g., Index 1 below).

Person 1—outParentOfChild1
Person 1—outParentOfChild2
Person 1—outParentOfChild1, outParentOfChild2
Person 2—outParentOfChild1
Person 2—outParentOfChild2
Person 2—bothBrotherOfPerson3
Person 2—outParentOfChild1, outParentOfChild2
Person 2—outParentOfChild1, bothBrotherOfPerson3
Person 2—outParentOfChild2, bothBrotherOfPerson3
Person 2—outParentOfChild1, outParentOfChild2, bothBrotherOfPerson3
Person 3—bothBrotherOfPerson2
Child 1—inParentOfPerson1
Child 1—inParentOfPerson2
Child 1—inParentOfPerson1, inParentOfPerson2
Child 2—inParentOfPerson1
Child 2—inParentOfPerson2
Child 2—inParentOfPerson1, inParentOfPerson2
Index 1

The index structure may be sorted and grouped, in step 503, according to the edge descriptors of the individual index entries. This may result in the following sorted groups (or buckets) B1 to B10.

B1: Person 1—outParentOfChild1
B1: Person 2—outParentOfChild1
B2: Person 1—outParentOfChild2
B2: Person 2—outParentOfChild2
B3: Person 1—outParentOfChild1, outParentOfChild2
B3: Person 2—outParentOfChild1, outParentOfChild2
B4: Person 2—bothBrotherOfPerson3
B4: Person 3—bothBrotherOfPerson2
B5: Person 2—outParentOfChild1, bothBrotherOfPerson3
B6: Person 2—outParentOfChild2, bothBrotherOfPerson3
B7: Person 2—outParentOfChild1, outParentOfChild2, bothBrotherOfPerson3
B8: Child 1—inParentOfPerson1
B8: Child 2—inParentOfPerson1
B9: Child 1—inParentOfPerson2
B9: Child 2—inParentOfPerson2
B10: Child 1—inParentOfPerson1, inParentOfPerson2
B10: Child 2—inParentOfPerson1, inParentOfPerson2
Sorted Groups B1—B10

The groups B1 to B10 may be pruned in step 505 based on their size. For example, groups with either only one row or too many rows (too many rows in a group means that an edge is common to many nodes and may thus be a bad similarity indicator). The resulting pruned index structure may be as follows.

B1: Person 1—outParentOfChild1
B1: Person 2—outParentOfChild1
B2: Person 1—outParentOfChild2
B2: Person 2—outParentOfChild2
B3: Person 1—outParentOfChild1, outParentOfChild2
B3: Person 2—outParentOfChild1, outParentOfChild2
B4: Person 2—bothBrotherOfPerson3
B4: Person 3—bothBrotherOfPerson2
B7: Child 1—inParentOfPerson1
B7: Child 2—inParentOfPerson1
B9: Child 1—inParentOfPerson2
B9: Child 2—inParentOfPerson2
B10: Child 1—inParentOfPerson1, inParentOfPerson2
B10: Child 2—inParentOfPerson1, inParentOfPerson2
Pruned Index Structure 1

Thus, for searching for the possible match candidates of a particular node (e.g. Person 1), only buckets, of the pruned buckets, that contain that node person 1 may be used for the search of duplicates in step 507. In this example, only buckets B1, B2 and B3 may be searched.

If the purpose of the analysis is to identify all duplicate candidates in the graph 520, the pruned buckets may be used as follows. Lists of nodes found in the same buckets may be determined. This may result in the following lists {P1, P2}; {P1, P2}; {P1, P2, P3}; {C1, C2}; {C1, C2}; {C1, C2}. P stands for Person and C stands for child. Next, duplicated lists or lists which are sub-lists of other lists may be removed. This may result in the following lists: {P1, P2, P3}; and {C1, C2}. For each remaining list, each node of the list may be compared against each node inside the same list. Thus, each list can be analyzed independently from the other buckets, making it suitable for a distributed analysis (e.g. Hadoop).

Figure 6:
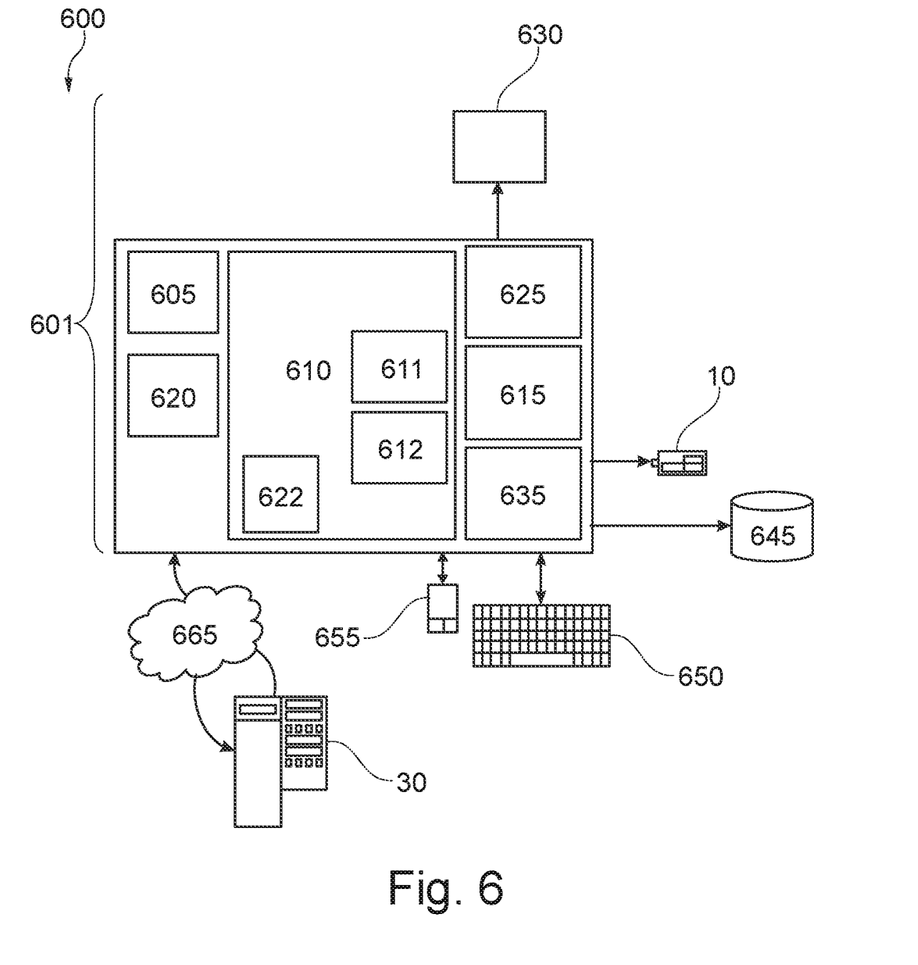
FIG. 6 represents a computerized system, suited for implementing one or more method steps as involved in the present subject matter.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 6, software in the memory 610 includes software 612 e.g., instructions to manage databases such as a database management system.

The software in memory 610 shall also typically include a suitable operating system (OS) 411. The OS 611 essentially controls the execution of other computer programs, such as possibly software 612 for implementing methods as described herein.

The methods described herein may be in the form of a source program (e.g., software 612), executable program (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   determining duplicates in a graph wherein the graph comprises nodes representing entities and edges that represent relationships between the entities by:
   identifying at least two nodes in the graph, wherein identifying at least two nodes in the graph comprises:
   calculating an index structure,
   grouping the index structure according to edge descriptors of individual index entries, resulting in a set of one or more groups,
   selecting a first node of the at least two nodes, and finding further nodes that are in a same group, of the set of groups, as the first node;
   determining a respective neighborhood subgraph for each of the two nodes, the neighborhood subgraph including a respective node;
   comparing the respective neighborhood subgraphs; and
   determining whether the two nodes are duplicates with respect to each other, based on a result of the comparison.

2. The computer-implemented method of claim 1, wherein determining of the neighborhood subgraph of the node comprises:
   selecting nodes of the graph using a selection criterion, the selection criterion being based on at least one of: a number of nodes, an entity represented by a node, a distance between the node and another node in the subgraph; the subgraph comprising the selected nodes.

3. The computer-implemented method of claim 2, wherein the selection criterion requires at least one of:
   the number of nodes of the subgraph being smaller than a maximum number;
   the edge of the subgraph connected to at least one node that represents a same entity as the entity of the node; and
   the distance between the node and another node in the subgraph is smaller than a threshold number of edges.

4. The computer-implemented method of claim 1, wherein comparing the respective subgraphs comprises:
   calculating a similarity metric;
   comparing the calculated similarity metric with a predefined threshold; and
   in response to determining that the similarity metric exceeds the predefined threshold determining whether the two nodes are duplicates.

5. The computer-implemented method of claim 1, further comprising:
   in response to determining that the two nodes are duplicates, performing a twin detection method, wherein the twin detection method comprises:
   acquiring additional properties of the entities represented by the two nodes; and
   cancelling a decision that the two nodes are duplicates with respect to each other based on the additional properties.

6. The computer-implemented method of claim 1, wherein the index structure comprises:
   for each node of the graph, at least one index entry, the index entry including an identifier of the node and an edge descriptor describing an edge connected to that node, wherein the edge descriptor comprises direction information related to a direction of the edge and/or a neighbor node identifier.

7. The computer-implemented method of claim 6, wherein the individual index entries are represented as text strings.

8. The computer-implemented method of claim 6, wherein the grouping further comprises deleting groups based on their size.

9. The computer-implemented method of claim 1, wherein determining of the neighborhood subgraphs comprises:
   removing duplicate nodes of each subgraph in the neighborhood subgraphs.

10. The computer-implemented method of claim 1, further comprising:
    using a received indication of the two identified nodes for the identifying.

11. A computer program product comprising:
    one or more computer readable storage media and program instructions stored on the one or more computer readable storage media, the program instructions comprising:
    program instructions to determine duplicates in a graph wherein the graph comprises nodes representing entities and edges that represent relationships between the entities by:
    program instructions to identify at least two nodes in the graph, wherein the program instructions to identify at least two nodes in the graph comprises:
    program instructions to calculate an index structure,
    program instructions to group the index structure according to edge descriptors of individual index entries, resulting in a set of one or more groups,
    program instructions to select a first node of the at least two nodes, and
    program instructions to find further nodes that are in a same group, of the set of groups, as the first node;
    program instructions to determine a neighborhood subgraph for each of the two nodes, the neighborhood subgraph including a respective node;
    program instructions to compare the respective neighborhood subgraphs; and
    program instructions to determine whether the two nodes are duplicates with respect to each other, based on a result of the comparison.

12. The computer program product of claim 11, wherein the program instructions to determine of the neighborhood subgraph of the node comprise:
    program instructions to select nodes of the graph using a selection criterion, the selection criterion being based on at least one of: a number of nodes, an entity represented by a node, a distance between the node and another node in the subgraph; the subgraph comprising the selected nodes.

13. The computer program product of claim 12, wherein the selection criterion requires at least one of:
    the number of nodes of the subgraph being smaller than a maximum number;
    the edge of the subgraph connected to at least one node that represents a same entity as the entity of the node; and
    the distance between the node and another node in the subgraph is smaller than a threshold number of edges.

14. The computer program product of claim 11, wherein the program instructions to compare the respective subgraphs comprise:
    program instructions to calculate a similarity metric;

program instructions to compare the calculated similarity metric with a predefined threshold; and program instructions to, in response to determining that the similarity metric exceeds the predefined threshold, determine whether the two nodes are duplicates.

15. The computer program product of claim 11, wherein the program instructions stored on the one or more computer readable storage media further comprise:

program instructions to, in response to determining that the two nodes are duplicates, perform a twin detection method, wherein the twin detection method comprises:
program instructions to acquire additional properties of the entities represented by the two nodes; and
program instructions to cancel a decision that the two nodes are duplicates with respect to each other based on the additional properties.

16. A computer system comprising:
one or more computer processors;
one or more computer readable storage media; and
program instructions stored on the one or more computer readable storage media for execution by at least one of the one or more computer processors, the program instructions comprising:
program instructions to determine duplicates in a graph wherein the graph comprises nodes representing entities and edges that represent relationships between the entities by:
program instructions to identify at least two nodes in the graph, wherein the program instructions to identify at least two nodes in the graph comprises:
program instructions to calculate an index structure,
program instructions to group the index structure according to edge descriptors of individual index entries, resulting in a set of one or more groups,
program instructions to select a first node of the at least two nodes, and
program instructions to find further nodes that are in a same group, of the set of groups, as the first node;
program instructions to determine a neighborhood subgraph for each of the two nodes, the neighborhood subgraph including a respective node;
program instructions to compare the respective neighborhood subgraphs; and
program instructions to determine whether the two nodes are duplicates with respect to each other, based on a result of the comparison.

17. The computer system of claim 16, wherein the program instructions to determine of the neighborhood subgraph of the node comprise:
program instructions to select nodes of the graph using a selection criterion, the selection criterion being based on at least one of: a number of nodes, an entity represented by a node, a distance between the node and another node in the subgraph; the subgraph comprising the selected nodes.

18. The computer system of claim 17, wherein the selection criterion requires at least one of:
the number of nodes of the subgraph being smaller than a maximum number;
the edge of the subgraph connected to at least one node that represents a same entity as the entity of the node; and
the distance between the node and another node in the subgraph is smaller than a threshold number of edges.

19. The computer system of claim 16, wherein the program instructions to compare the respective subgraphs comprise:
program instructions to calculate a similarity metric;
program instructions to compare the calculated similarity metric with a predefined threshold; and
program instructions to, in response to determining that the similarity metric exceeds the predefined threshold, determine whether the two nodes are duplicates.

20. The computer system of claim 16, wherein the program instructions stored on the one or more computer readable storage media further comprise:
program instructions to, in response to determining that the two nodes are duplicates, perform a twin detection method, wherein the twin detection method comprises:
program instructions to acquire additional properties of the entities represented by the two nodes; and
program instructions to cancel a decision that the two nodes are duplicates with respect to each other based on the additional properties.

* * * * *